Jan. 27, 1970  J. T. TEMP  3,491,743
THROW-AWAY GRILL AND CARDBOARD PACKING TO BE USED
TOGETHER WITH THIS GRILL
Filed Nov. 17, 1967

INVENTOR
John Toft Temp
BY Kenyon, Palmer,
Stewart & Estabrook
ATTORNEY

United States Patent Office 3,491,743
Patented Jan. 27, 1970

3,491,743
THROW-AWAY GRILL AND CARDBOARD PACKING TO BE USED TOGETHER WITH THIS GRILL
John Toft Temp, Kirkegade 9–11, Randers, Denmark
Filed Nov. 17, 1967, Ser. No. 684,030
Claims priority, application Denmark, Nov. 30, 1966, 6,187/66
Int. Cl. F24c *1/16;* F24b *3/00;* A47j *37/07*
U.S. Cl. 126—9
6 Claims

ABSTRACT OF THE DISCLOSURE

A throw-away grill with a space containing charcoal and igniting material, the space being upwardly limited by a grating made of metal and in all other directions by a tray of metal foil coated on the inside with heat insulating material, the grating being secured to the edges of the tray. The grill is used together with a cardboard packing which can be transformed into a support for the grill.

---

The present invention relates to a throw-away grill providing a space containing combustible material, i.e. charcoal, surrounded by igniting material, the space being in the upward direction limited by a grating made of metal.

The object of the invention is to provide a throw-away grill whereby the drawbacks in same known throw-away barbecue grills are eliminated and according to the invention this is achieved by the space being limited in all other directions by a tray made of metal foil and coated on the inside with a heat-insulating material, the grating being secured to the edge of the tray. By the use of a non-perforated tray, there is obtained a disposable barbecue grill from which neither glowing charcoal nor any fat can fall or drip onto a supporting surface. The unperforated tray, however, has the effect that there can be no draught through the bottom of the tray, which has the effect of rendering combustion difficult, particularly since only a small quantity of combustible material is contained in such a grill. This drawback is eliminated here by the tray being heat-insulating which further has the effect that almost all heat produced during combustion is being directed through the surface designed for that purpose, i.e. through the grating. Furthermore, the fat can be absorbed by the heat-insulating material so that the risk of the inflammable fat catching fire is reduced.

Moreover, the invention relates to a cardboard packing to be used together with the grill described and according to the invention the packing is designed and arranged in such a manner that by slitting and folding it can be transformed into a support on which the grill can be placed so that the tray is supported only by the edges of the cardboard packing. The use of a cardboard packing as a support is made possible by the heat-insulating property of the tray and by the fact that the tray is nowhere supported by cardboard surfaces. If the tray was supported by cardboard surfaces, there would be a certain risk of the cardboard being set on fire despite the heat-insulating effect of the tray. The resulting support permits the tray to be placed at a suitable distance from the supporting surface so that damage by heat of the surface is eliminated.

Figure 1:
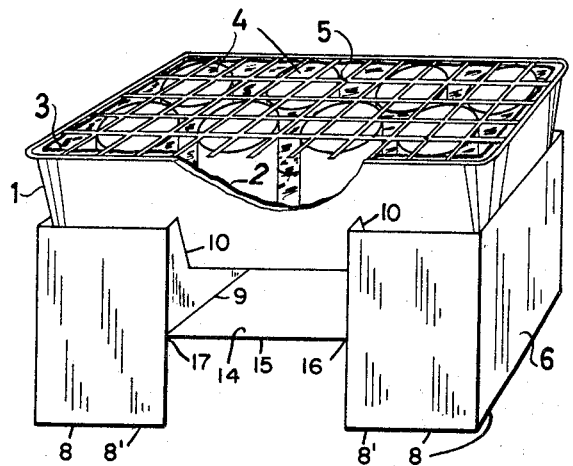
Figure 2:
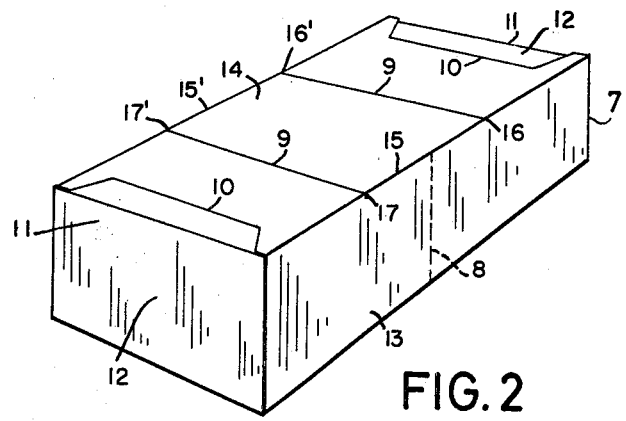

The invention is illustrated in the accompanying drawing, which shows diagrammatically in FIG. 1 an embodiment of the grill according to the invention and in FIG. 2 an embodiment of the cardboard packing.

The throw-away grill shown in FIG. 1 comprises a tray 1 which e.g. is made of an aluminium sheet, and the inside of which is coated with a heat-insulating material 2 made for instance of expanded mica. In the tray coated in such manner an igniting material 3 is placed, on top of which charcoal 4 is put. On its upper side the tray is limited by a metal grid 5 which is secured to the edge of the tray. The metal grid can exist of thin steel wires which are spot-welded in such a way as to obtain a square pattern.

The igniting material can consist of a layer of woodwool which is impregnated with a mixture of stearin and paraffin. The grill is lit by igniting layer 3. When after a rather short time the igniting material is burned away, the charcoal has been ignited and has fallen somewhat down into the tray whereby a convenient space between the glowing charcoal and the grid is provided. Thereafter the grilling itself can begin.

The throw-away grill is packed in a cardboard packing 7 as shown in FIG. 2 which is convertible by a simple cutting and folding operation into a support for the grill as shown in FIG. 1. The cardboard packing is designed with perforations 8 which extend down the one side 13, across the bottom and up the opposite side, but not across the top 14. However, the top 14 has impressed therein two fold lines 9 and is cut back to form recesses along the edges 10. The packing 7 is converted into the support, after removing the enclosed grill from it, by folding inwardly the end flaps or covers 11 and 12, slitting or tearing the cardboard along the perforation line 8, cutting or slitting the edge 15 on one side from point 16, which is the junction of one fold line 9 with the edge, to point 17, which is the junction of the other fold line 9 with the edge and similarly cutting the opposite edge 15′ between corresponding points 16′ and 17′. Finally, the package which has been so slit is folded about the fold lines 9 to produce the configuration shown in FIG. 1 in which the edges 8′ that were formed by the slitting of the perforation line 8 become the base edges of a pair of pillars joined by the inner section of the top 14, and the edges 10 of the top 14 become the support for the grill. In this manner, the grill is supported only by edges of the cardboard and not anywhere by cardboard surfaces. Also, the bottom of the grill rests at an appreciable distance above the carrying surface on which the support is placed, thereby keeping the carrying surface away from any heat from the bottom of the grill tray.

The throw-away grill shown is essentially rectangular, however, it can have any other form, e.g. a circular or square shape.

If the material used for manufacturing the tray is in itself sufficiently heat-insulating, then it will not be necessary for the tray to be coated with heat-insulating material.

What I claim is:

1. A disposable barbecue grill device comprising in combination a grill and a cardboard container therefor, said grill comprising a tray of metal foil, an open-mesh grating of metal secured to the top edge of said tray, a separate lining of heat-insulating material secured to the inner surface of said tray and combustible material contained within the grill between said lining and said grating and said container being formed of cardboard sheet comprising a plurality of intersecting sides, preformed fold lines and perforations positioned in said sides so that by slitting sides along said perforations and folding along said lines, said container can be transformed into a support on which said grill can be placed so that it is supported only by edges of cardboard sheet.

2. A disposable barbecue grill device as claimed in claim 1 wherein said heat-insulating material is expanded mica.

3. A disposable barbecue grill device as claimed in claim 1 wherein said combustible material comprises charcoal and an igniting material.

4. A disposable barbecue grill device as claimed in claim 1 wherein said metal grating is made of metal wire spot-welded to form a square grid pattern.

5. A disposable barbecue grill device as claimed in claim 1 wherein said fold lines extend transversely of a first side of the container between the container ends and its middle and said perforations constitute a line extending transversely of the middle of the second, third and fourth sides of the container.

6. A disposable barbecue grill device as claimed in claim 5 wherein said container when transformed into said grill support creates a pair of pillars joined by the inner section of said first side defined by said fold lines.

References Cited
UNITED STATES PATENTS

| | | |
|---|---|---|
| 2,236,992 | 4/1941 | Broadley. |
| 2,943,557 | 7/1960 | Suehlsen. |
| 2,965,096 | 12/1960 | Barton. |
| 3,266,478 | 8/1966 | Booth _____ 126—25 |
| 3,309,982 | 3/1967 | Surks _____ 126—25 X |
| 3,375,816 | 4/1968 | Chestnut _____ 126—25 |

FREDERICK L. MATTESON, Jr., Primary Examiner

ROBERT A. DUA, Assistant Examiner